US010051996B2

(12) United States Patent
Starr

(10) Patent No.: US 10,051,996 B2
(45) Date of Patent: Aug. 21, 2018

(54) TOASTER OVEN CONTROL KNOB AND METHOD OF CONTROLLING A TOASTER OVEN

(71) Applicant: Hamilton Beach Brands, Inc., Glen Allen, VA (US)

(72) Inventor: William D Starr, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 185 days.

(21) Appl. No.: 15/181,532

(22) Filed: Jun. 14, 2016

(65) Prior Publication Data

US 2017/0059173 A1    Mar. 2, 2017

Related U.S. Application Data

(63) Continuation-in-part of application No. 15/003,337, filed on Jan. 21, 2016.

(60) Provisional application No. 62/209,435, filed on Aug. 25, 2015.

(51) Int. Cl.
*F27D 5/00* (2006.01)
*A47J 37/06* (2006.01)
*G05G 1/08* (2006.01)

(52) U.S. Cl.
CPC ....... *A47J 37/0629* (2013.01); *A47J 37/0664* (2013.01); *G05G 1/082* (2013.01)

(58) Field of Classification Search
CPC .... A47J 37/0629; A47J 37/0664; A47J 37/00; G05G 1/082; G05G 1/08; G05G 1/087
See application file for complete search history.

(56) References Cited

U.S. PATENT DOCUMENTS 4,382,175 A * 5/1983 Huggler ............... A47J 37/085
219/396

\* cited by examiner

*Primary Examiner* — Shawntina Fuqua
(74) *Attorney, Agent, or Firm* — Alexander D. Raring

(57) ABSTRACT

A toaster oven comprising a housing defining a food cavity, an opening defined in the housing, a door movably affixed to the housing, a cooking grid selectively mountable within the housing, one or more heating elements within the housing, a timer controlling activation of the heating elements, and a timer control knob engaged with the timer. The timer control knob is selectively rotatable in a second direction from the off position to a third position to activate at least one of the one or more heating elements until the timer control knob is selectively rotated in the first direction back to the off position. The timer control knob is only selectively rotatable in the second direction from the off position to the third rotational position when a main body of the timer control knob is moved longitudinally from a first longitudinal position to a second longitudinal position.

7 Claims, 7 Drawing Sheets

TOASTER OVEN CONTROL KNOB AND METHOD OF CONTROLLING A TOASTER OVEN

CROSS-REFERENCE TO RELATED APPLICATIONS

This application is a continuation-in-part of and claims priority to U.S. patent application Ser. No. 15/003,337, filed Jan. 21, 2016, which in turn claims priority to U.S. Provisional Patent Application Ser. No. 62/209,435, filed Aug. 25, 2015, the contents of which are incorporated herein by reference in its entirety.

BACKGROUND OF THE DISCLOSURE

The present disclosure relates generally to small appliances, and more particularly to toaster ovens.

A toaster oven is a small appliance that functions as both a toaster and an oven. In that regard, a toaster oven often has a control knob that controls the duration of operation of the toaster oven. As an example, a conventional toaster oven control panel 10 is illustrated in FIG. 1. The conventional control panel 10 has three control knobs. Control knob 12 controls the temperature during operation of the toaster oven. Control knob 14 controls which function is to be performed (e.g., toast, bake, broil, etc.). Control knob 16 controls the duration of operation of the toaster oven. In this regard, the control knob 16 can either activate the toaster oven for a desired number of minutes or activate the toaster oven until the user turns the toaster oven off (this latter feature is typically termed the "stay on" feature).

In the embodiment illustrated in FIG. 1, the toaster oven is deactivated when the control knob 16 is facing the "off" setting (i.e., the 9:00 clock position on the illustrated control panel 10, although this may vary). To activate the toaster oven for a desired number of minutes, the control knob 16 is turned clockwise to the number 18 indicative of the desired duration (in minutes) of operation of the toaster oven. The control knob 16 is typically coupled to a mechanical timer (not illustrated), so turning the control knob 16 clockwise to the desired number activates the timer and therefore the operation of the toaster oven for the set number of minutes.

To activate the toaster oven until it is turned off ("stay on"), the user turns the control knob 16 counterclockwise to the "stay on" setting 20. The toaster oven will then remain activated until the user turns the control knob 16 back to the "off" setting.

Occurrences of the power spring inside the mechanical timer forcing the dial past the "off" position into the "stay on" position have occurred. This creates the possibility, in very limited instances, for the toaster oven to remain energized indefinitely without any deliberate (accidental or intentional) action by the user, thereby creating a safety and fire hazard. It is also possible for a user to unintentionally turn the control knob to the "stay on" setting, especially if the user is turning the knob counterclockwise to turn off the toaster oven before the set time has expired. If the user does not notice that the knob has been unintentionally turned to the "stay on" setting, the toaster oven may remain on for an extended period, thereby creating a safety and fire hazard.

A change has been proposed to appliance industry safety standards that would require that, if a mechanical clock-operated switch incorporates a stay-on feature which is activated in the same direction as the countdown to "off," a secondary action is required to engage the stay-on feature. It has heretofore not been discovered how to create a toaster oven with a clock-operated switch having a stay-on feature which is activated in the same direction as the countdown to "off," and also having the required secondary action to engage the stay-on feature, in a simple and cost-effective manner. The toaster oven control knob of the following disclosure accomplishes the above and other objectives and overcomes at least the above-described disadvantages of conventional toaster ovens.

BRIEF SUMMARY OF THE DISCLOSURE

A toaster oven is disclosed herein. In one embodiment of the subject appliance, the toaster oven comprises a housing defining a food cavity, an opening defined in the housing to enable access to the food cavity, a door movably affixed to the housing and selectively movable between a closed position closing off the opening thereby blocking access to the food cavity and an open position enabling access to the food cavity, a cooking grid selectively mountable within the housing, one or more heating elements within the housing, a timer controlling activation of the heating elements, and a timer control knob engaged with the timer. The timer control knob is selectively rotatable in a first direction from an off position to a second position to set the timer and activate at least one of the one or more heating elements for a desired amount of time corresponding to the second position. The timer control knob is selectively rotatable in a second direction from the off position to a third position to activate at least one of the one or more heating elements until the timer control knob is selectively rotated in the first direction back to the off position, the second direction being opposite the first direction. The timer control knob comprises a stem affixed to the timer and a main body selectively movably affixed to the stem. The main body is selectively movable longitudinally between a first longitudinal position and a second longitudinal position. The timer control knob is only selectively rotatable in the second direction from the off position to the third rotational position when the main body is moved from the first longitudinal position to the second longitudinal position.

The main body may be biased toward the first longitudinal position.

A stationary block may project from the housing. The control knob may further comprise a stop tab. When the main body is in the first longitudinal position, the stop tab may be aligned with the stationary block to prevent rotation of the timer control knob in the second direction from the off position to the third rotational position. When the main body is in the second longitudinal position, the stop tab may not be aligned with the stationary block to permit rotation of the timer control knob in the second direction from the off position to the third rotational position.

The stationary block and/or the stop tab may be sized and positioned such that, when the control knob is in the third rotational position, the main body is prevented from returning to the first longitudinal position.

The stationary block may have an angled surface that engages with the stop tab as the timer control knob is rotated from the third position in the first rotational direction and/or the stop tab may have an angled surface that engages with the stationary block as the timer control knob is rotated from the third position in the first rotational direction. Such engagement may push the main body from the first longitudinal position to the second longitudinal position to permit rotation of the timer control knob in the first rotational direction back to the off position.

The main body may be further from the housing when the main body is in the first longitudinal position than when the main body is in the second longitudinal position such that pushing the main body toward the housing moves the main body from the first longitudinal position to the second longitudinal position.

The main body may be further from the housing when the main body is in the second longitudinal position than when the main body is in the first longitudinal position such that pulling the main body away from the housing moves the main body from the first longitudinal position to the second longitudinal position.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
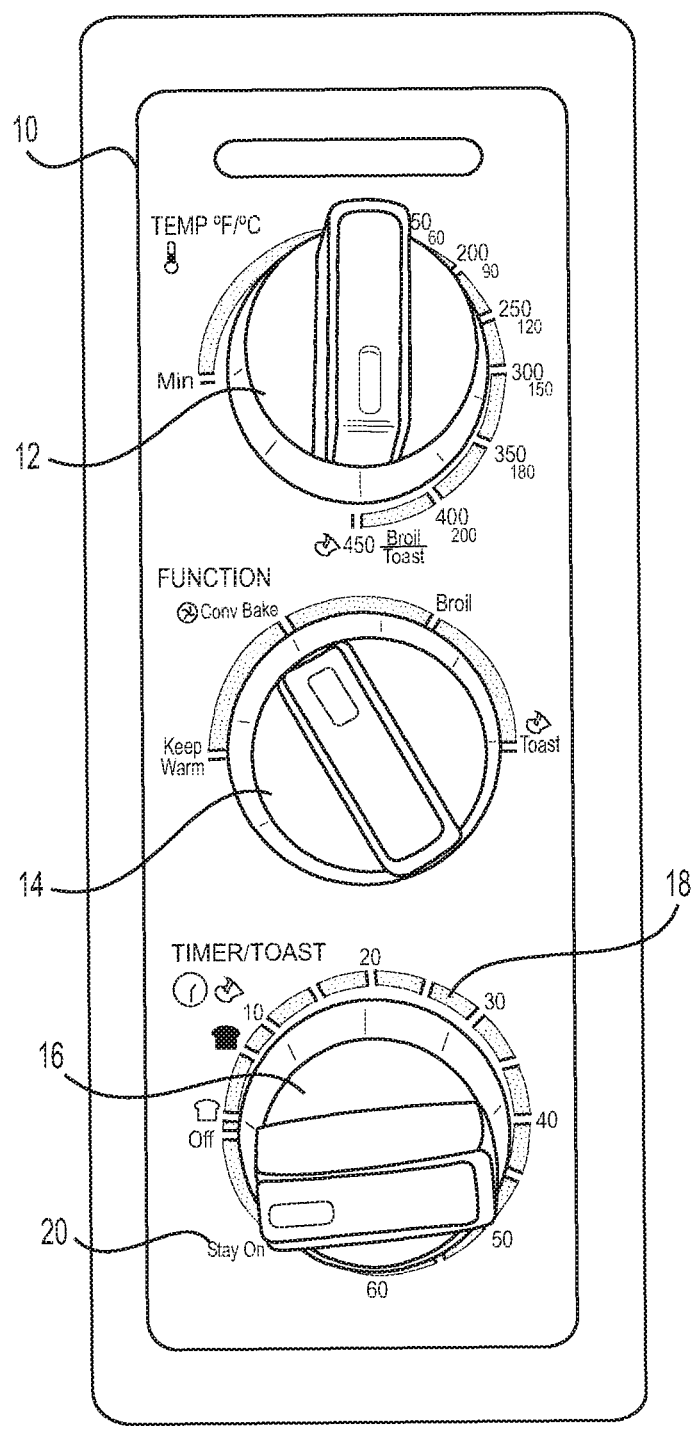
FIG. 1 is a front view of a conventional toaster oven control panel.
Figure 2:
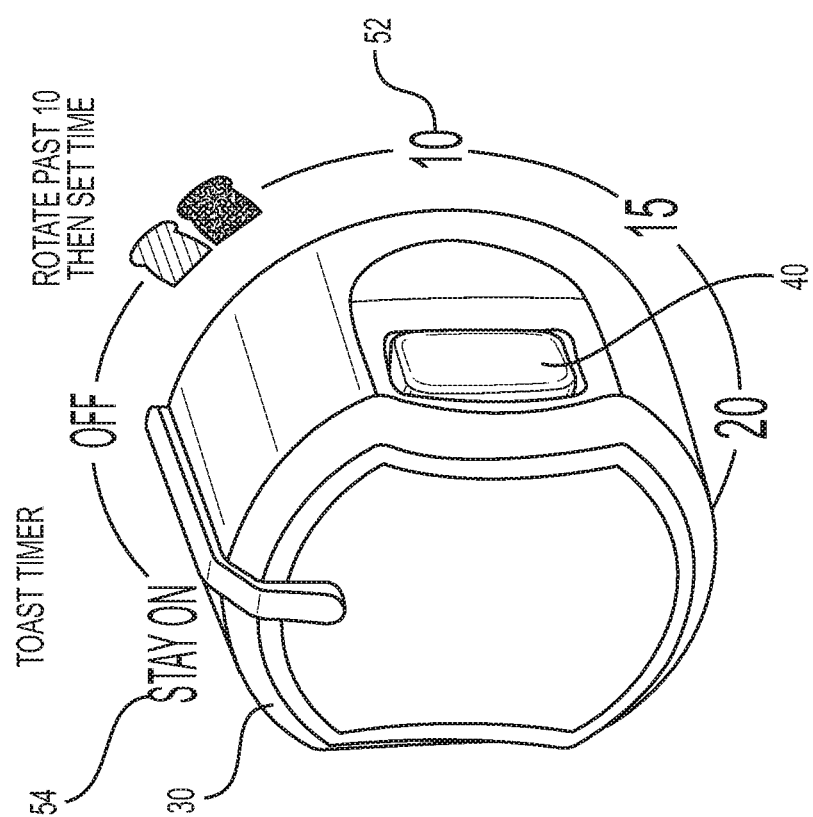
FIG. 2 is a perspective view of a toaster oven control knob, according to one embodiment of the present disclosure.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 2-5 illustrate a toaster oven control knob 30 in accordance with a preferred embodiment of the present disclosure. Control knob 30 and associated stationary block 60 provide a simple and cost-effective means for adding a secondary action to engage the stay-on feature in a toaster oven with a clock-operated switch having a stay-on feature which is activated in the same direction as the countdown to "off." Control knob 30 may be incorporated into any suitable toaster oven or other similar cooking appliance.

Similar to a conventional control knob, control knob 30 is selectively rotatable clockwise and counterclockwise to either activate a toaster oven for a desired number of minutes or to activate the toaster oven until it is turned off ("stay on"). In the illustrated embodiment, the toaster oven is deactivated when the control knob 30 is facing the "off" setting (i.e., the 12:00 clock position on the illustrated legend). To activate the toaster oven for a desired number of minutes, the control knob 30 is turned clockwise to the number 52 indicative of the desired duration (in minutes) of operation of the toaster oven. To activate the toaster oven until it is turned off ("stay on"), the user turns the control knob 30 counterclockwise to the "stay on" setting 54. The toaster oven will then remain activated until the user turns the control knob 30 counterclockwise back to the "off" setting.

As with a conventional control knob, the control knob 30 may be coupled to a mechanical timer (not illustrated). A stem 36 extends from the rear side of the control knob 30, such that the stem 36 protrudes through a hole 64 defined in the face of the toaster oven 56 (partially illustrated in FIG. 5) when the control knob 30 is mounted to the toaster oven. A cavity 38 defined in the stem 36 engages a corresponding post of the mechanical timer (not illustrated), so turning the control knob 30 turns the post of the mechanical timer.

The main body 32 of the control knob 30 may be generally bell-shaped, with an open rear side and hollow interior such that an internal chamber 34 is defined therein. The stem 36 extends out of this chamber 34.

Unlike a conventional control knob, the control knob 30 of embodiments of the present disclosure includes at least a first button 40 and optionally a second button 42. The first button 40 may be positioned on an exterior side of the control knob 30, such that the first button 40 is readily depressed by a user as needed (as described further below). If the second button 42 is present, the second button 42 may be positioned on an exterior side of the control knob 30 opposite the first button, such that both buttons are readily depressed simultaneously by a user as needed.

Figure 3:
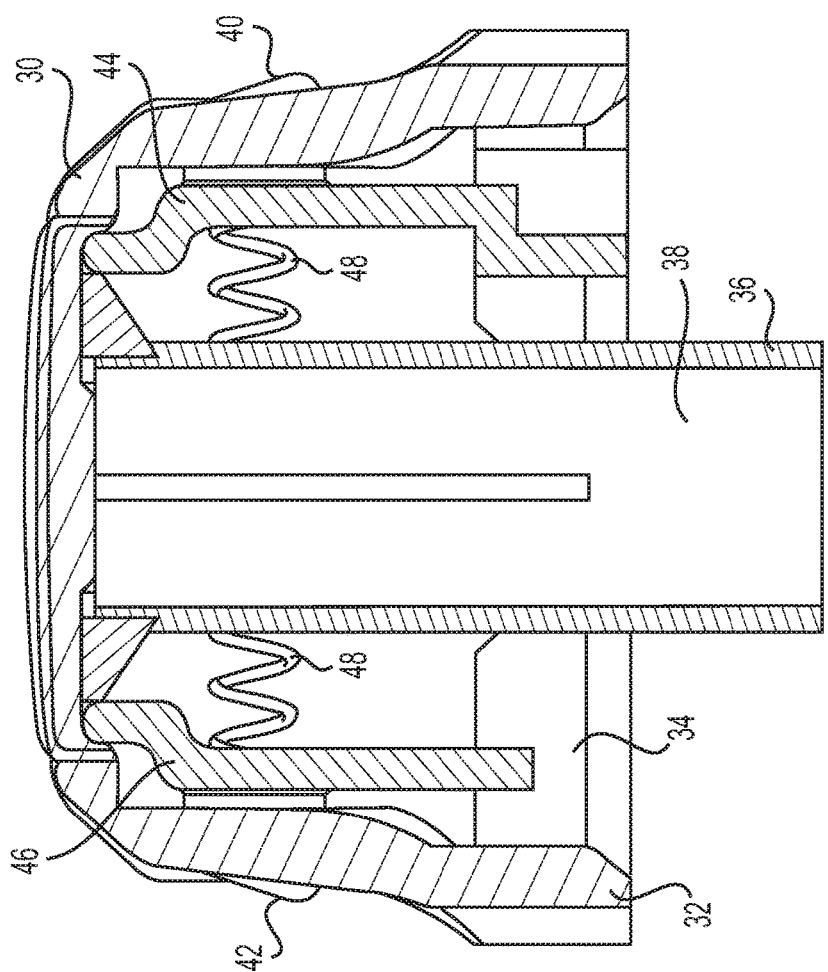
FIG. 3 is a cross-sectional view of the toaster oven control knob of FIG. 2.

The first button 40 is affixed to or integral with a lock lever 44 that extends toward the open rear side, as illustrated in FIG. 3. The lock lever 44 extends close enough to the opening at the rear side of the control knob to engage the stationary block (as described further below) but does not extend past the opening (which would cause the lock lever 44 to undesirably contact the face of the toaster oven). The first button 40 and lock lever 44 are biased outward, such as with bias spring 48.

If there is a second button 42, the second button may or may not be affixed to or integral with a lever 46 that may extend toward the open rear side, as illustrated in FIG. 3. The lever 46, if it exists, should not extend close enough to the opening at the rear side of the control knob to engage the stationary block at any point during the rotation of the control knob 30. The second button 42 and lever 46 are biased outward, such as with bias spring 48.

Figure 4:
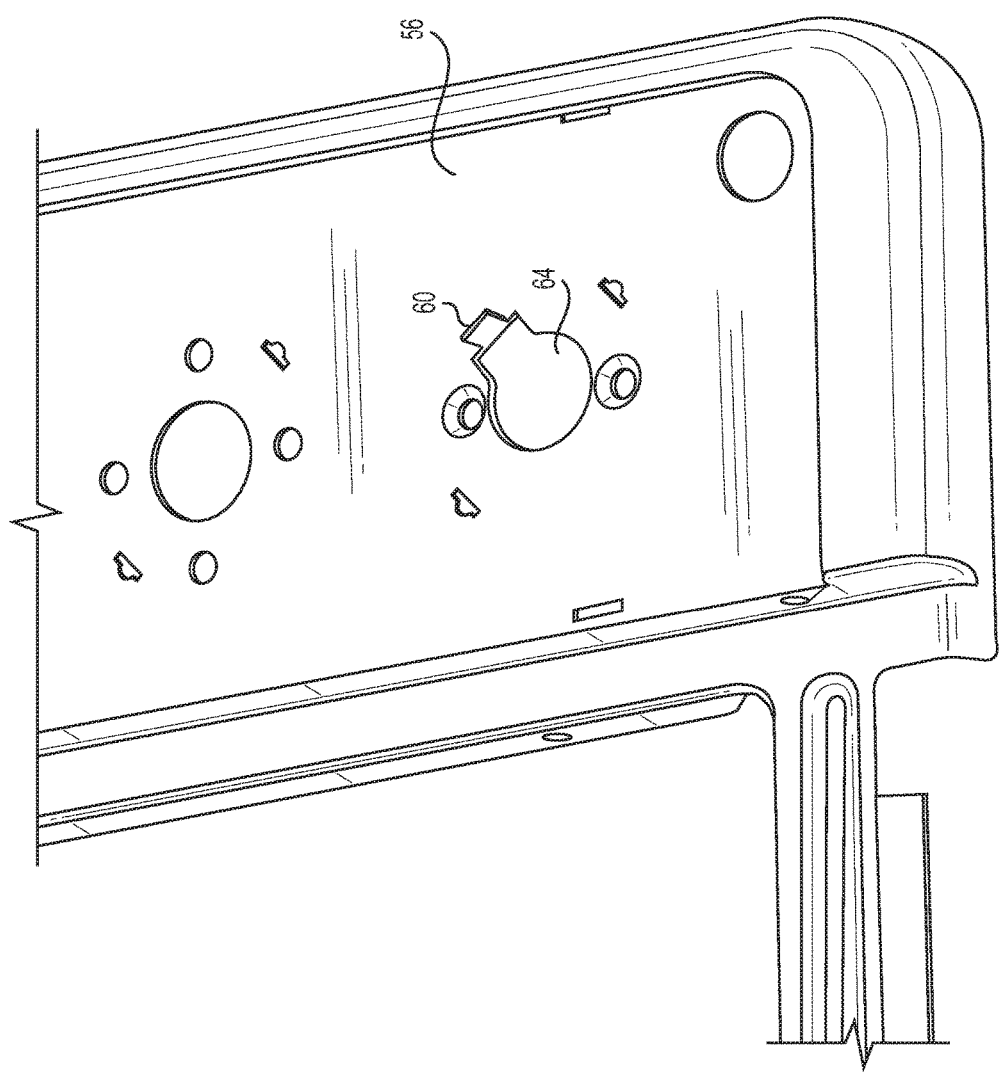
FIG. 4 is a partial front view of a toaster oven for use with the toaster oven control knob of FIG. 2, but with the toaster oven control knob removed.

A stationary block 60 protrudes outward from the face of the toaster oven 56. The stationary block is positioned such that the main body 32 of the control knob 30 covers the stationary block (i.e., most or all of the stationary block is within the chamber 34) when the control knob 30 is mounted to the toaster oven. As illustrated in FIG. 4, the stationary block 60 may comprise a thin planar projection. The stationary block 60 of FIG. 4 is stamped, cut, or otherwise formed from the face of the toaster oven as a tab that is folded out such that it is substantially perpendicular to the face of the toaster oven.

The stationary block 60 and lock lever 44 are positioned such that, when the control knob 30 is in place on the toaster oven and in the "off" setting, the lock lever 44 is adjacent the stationary block 60. In this regard, the distal end of the lock lever 44 would contact and be blocked by the stationary block 60 when a user attempts to turn the control knob 30 from the "off" position (counterclockwise in the illustrated embodiment) to the "stay on" position, thus preventing rotation of the control knob 30 from the "off" position to the "stay on" position (unless, as described below, the first button 40 is depressed to move the lock lever 44). The leading edge 58 of the distal end of the lock lever 44 may be squared off (planar), as seen in FIG. 5, to ensure good contact between the lock lever 44 and the stationary block 60 to block the rotation of the control knob from the "off" position (counterclockwise in the illustrated embodiment) to the "stay on" position.

In order for a user to be able to turn the control knob 30 from the "off" position (counterclockwise in the illustrated embodiment) to the "stay on" position, the user must depress the first button 40 (the user may also depress the second button 42, if present, but that may or may not be necessary). Depressing the first button 40 causes the lock lever 44 to move inward (for example, by a sliding or pivoting motion, or any other suitable motion or mechanism). This inward movement of the lock lever 44 allows the distal end of the lock lever 44 to clear the stationary block 60, thereby enabling the control knob 30 to be rotated (counterclockwise in the illustrated embodiment) from the "off" position to the "stay on" position. Once the distal end of the lock lever 44 has rotated past the stationary block 60 and the user releases the first button 40, the first button and the lock lever 44 will move outward and return to their original positions due to the outward biasing.

Figure 5:
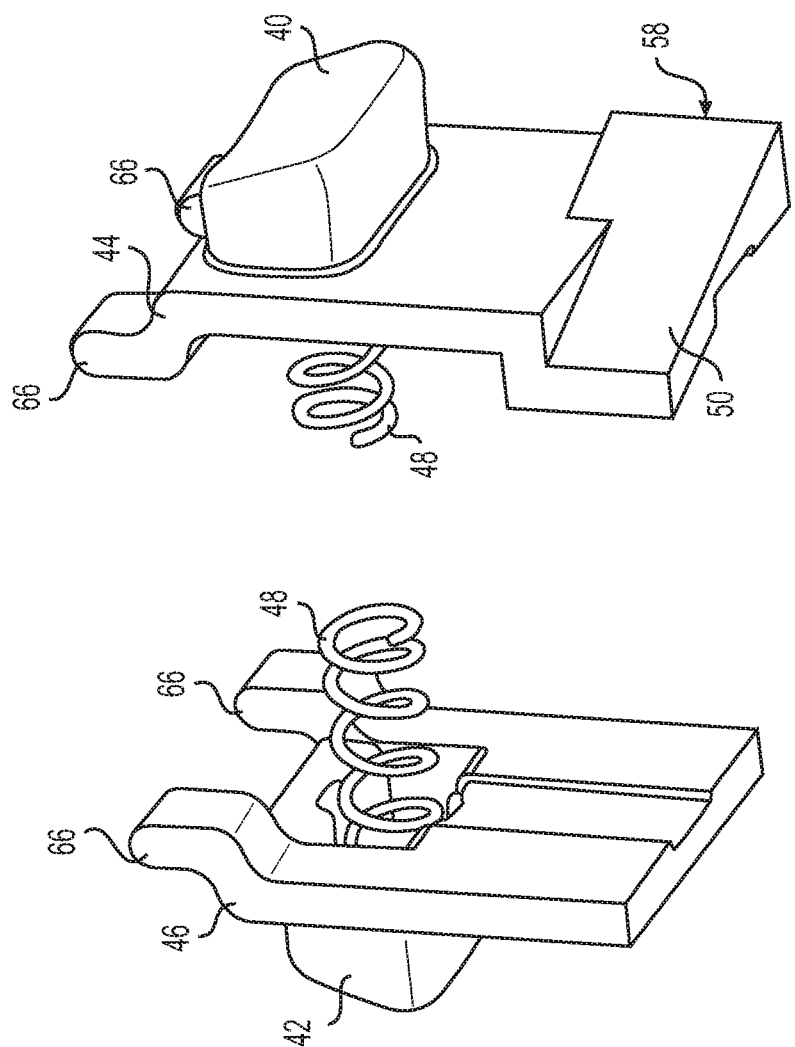
FIG. 5 is a perspective view of components of the toaster oven control knob of FIG. 2.

FIG. 5 illustrates the buttons, lock levers, and bias springs of control knob 30, removed from the control knob. As seen in FIG. 4, the first button 40 is integral with or affixed to lock lever 44, and the second button 42 is integral with or affixed to lock lever 46. As such, depressing the first button 40 causes the lock lever 44 to move inward and depressing the second button 42 causes the lock lever 46 to move inward. In the illustrated embodiment, the lock levers pivot inward when the corresponding button is depressed. Each lock lever comprises pivot arms 66 that engage the inside top surface of the knob to enable the distal ends (i.e., the ends closer to the face of the toaster oven) to pivot inward.

When the user wants to turn the toaster oven off (from the "stay on" position), the user rotates the control knob 30 clockwise from the "stay on" position to the "off" position. In order for the distal end of the lock lever 44 to NOT be blocked by the stationary block 60 when the user attempts to turn the control knob 30 clockwise from the "stay on" position to the "off" position, the user may be required to depress the first button 40 again. However, requiring the user to depress the first button 40 again may not be desirable. Instead, lock lever 44 (i.e., the lock lever which engages the stationary block) may have an angled surface 50 that engages with the stationary block as the control knob 30 is rotated from the "stay on" setting to the "off" setting. This engagement between the angled surface and the stationary block pushes the lock lever 44 inward (toward the stem 36) to permit rotation of the control knob back to the "off" setting without having to depress the first button 40. In other words, while it is necessary to depress the first button 40 to rotate the knob 30 from the "off" setting to the "stay on" setting, it is not necessary to depress the first button 40 to rotate the knob 30 from the "stay on" setting to the "off" setting. Once the distal end of the lock lever 44 has rotated past the stationary block 60, the first button and the lock lever 44 will move outward and return to their original positions due to the outward biasing.

Other shapes of the distal end of the lock lever 44 and of the stationary block 60 may be possible, as long as the desired blocking of the counterclockwise rotation from the "off" position to the "stay on" position is provided (except when the first button or a similar mechanism is depressed) and the desired allowance of the clockwise rotation of the control knob from the "stay on" position to the "off" position is enabled (preferably regardless of whether the first button or a similar mechanism is depressed).

The stationary block 60 comprises a thin metal tab. In alternative embodiments, the stationary block may be thicker. If the stationary block is thicker, it may be desirable for the stationary block to have an angled surface that engages with the angled surface of the lock lever as the control knob 30 is rotated from the "stay on" setting to the "off" setting. Having angled surfaces on both the lock lever and the stationary block may better facilitate the desired inward forcing of the lock lever to permit rotation of the control knob back to the "off" setting without having to depress the first button.

The stationary block may be any suitable height that provides the desired blocking of the counterclockwise rotation from the "off" position to the "stay on" position (except when the first button or a similar mechanism is depressed), but which does not otherwise interfere with the operation or rotation of the control knob.

It is described above that, once the distal end of the lock lever 44 has rotated past the stationary block 60 and the user releases the first button 40, the first button and the lock lever 44 will move outward and return to their original positions due to the outward biasing. In other words, the lock lever and the stationary block are clear of each other and not contacting when the control knob is in the "stay on" position. In alternative embodiments of the invention, the lock lever and/or stationary block may be sized and/or positioned such that the lock lever and the stationary block remain in contact, and the lock lever remains pushed inward, when the control knob is in the "stay on" position.

It may be desirable for there to be several degrees of rotational space between the lock lever and the stationary block when the control knob is in the "off" position to help ensure that the stationary block does not interfere with the inward motion of the lock lever.

Figure 6:
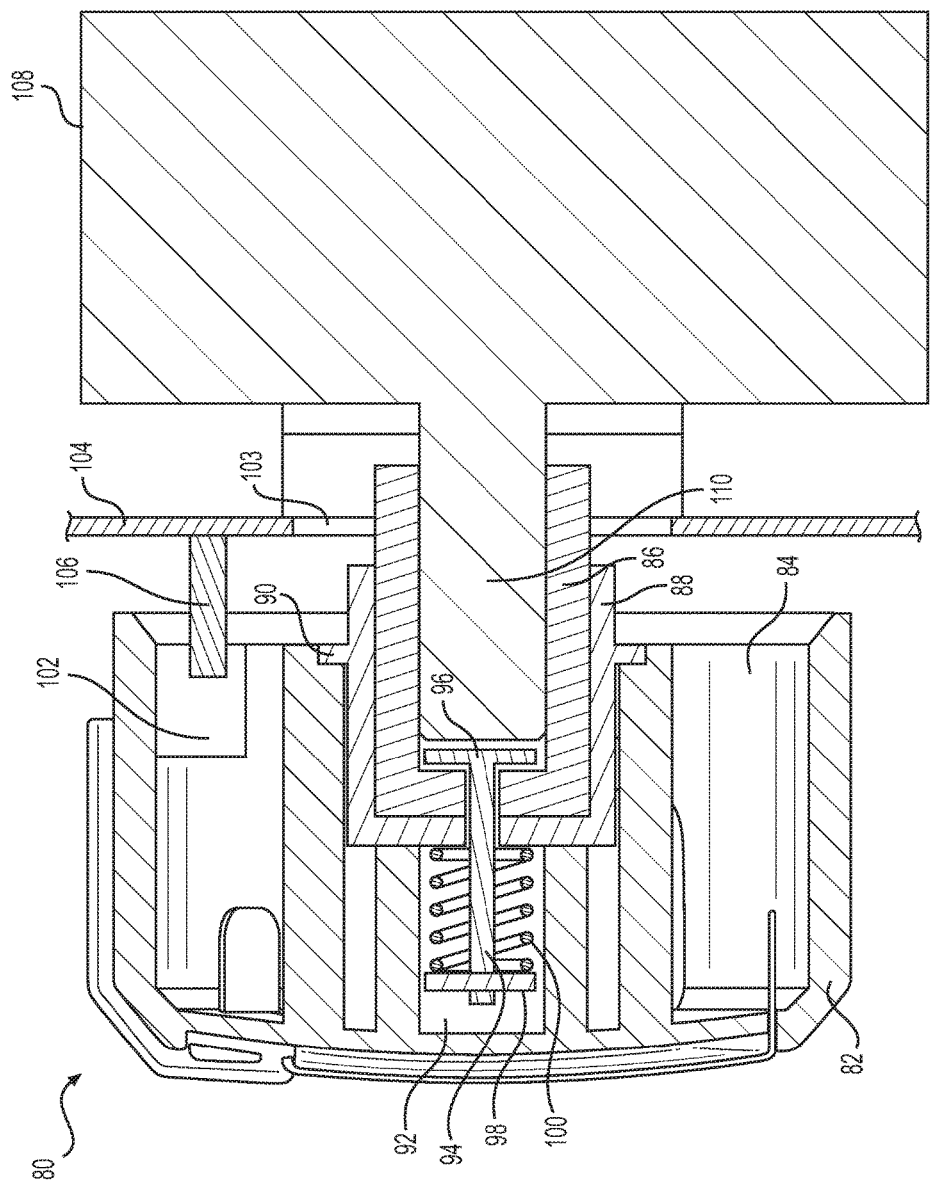
FIG. 6 is a cross-sectional view of a toaster oven control knob, according to an alternative embodiment of the present disclosure.

Referring now to FIG. 6, a toaster oven control knob 80 is illustrated in accordance with an alternative embodiment of the present disclosure. The control knob 80 has a stem 86 that extends from the rear side of the control knob 80, such that the stem 86 protrudes through a hole 103 defined in the face 104 of a toaster oven when the control knob 80 is mounted to the toaster oven. A cavity defined in the stem 86 engages a corresponding post 110 of a mechanical timer 108, so turning the control knob 80 turns the post 110 of the mechanical timer 108. The main body 82 of the control knob 80 may be generally bell-shaped, with an open rear side and hollow interior such that an internal chamber 84 is defined therein. The stem 86 extends out of this chamber 84.

The main body 82 is selectively movable longitudinally between a first (inward) longitudinal position (illustrated in FIG. 6) and a second (outward) longitudinal position (not illustrated). The main body is biased inward toward the first longitudinal position. The main body 82 is further from the face 104 when the main body 82 is in the second longitudinal position than when the main body 82 is in the first longitudinal position. Pulling the main body 82 away from the face 104 moves the main body from the first longitudinal position to the second longitudinal position. The timer control knob 80 is only selectively rotatable in the second direction from the "off" position to the "stay on" position when the main body is moved from the inward longitudinal position to the outward longitudinal position. In this regard, control knob 80 may be termed a "pull-to-turn" knob.

The stem 86 is affixed firmly to the timer shaft 110. A sliding collar 88 is affixed to the main body 82 of the control knob 80, such as with a shoulder 90 that engages a corresponding circumferential slot on the main body 82 (or any other suitable retaining mechanism). The stem 86 and sliding collar 88 are slidably engaged. The stem 86 and sliding collar 88 may comprise corresponding position-assuring mechanisms (e.g., key and slot) such that the stem 86 and sliding collar 88 may only be engaged in one orientation (i.e., the orientation to ensure the proper alignment of the stationary block and stop tab (described below)). It is the slidable engagement between the stem 86 and the sliding collar 88 that enables the main body 82 to be selectively moved longitudinally outward and inward. The main body 82 and sliding collar 88 are secured to the stem 86 via a retainer pin 94. An inward end of the retainer pin 94 has an enlarged head 96 that is positioned within the cavity in the stem 86. The elongated body of the retainer pin 94 protrudes through corresponding center holes in the stem 86 and the sliding collar 88. The outward end of the retainer pin 94 is positioned within a central cavity 92 of the main body 82. A compression spring 100 encircles the portion of the elongated body of the retainer pin 94 that is in the central cavity 92 of the main body 82. A retainer ring 98 is affixed to the outward end of the retainer pin 94. When a user grasps the main body 82 and pulls outward, the main body 82 and sliding collar 88 move longitudinally outward relative to the stem 86. The spring 100 is compressed between the retainer ring 98 and the sliding collar 88. The main body 82 can only be pulled outward as far as the retainer pin 94 permits—when the spring 100 is fully compressed against the sliding collar 88 by the retainer ring 98, the main body 82 is at the limit of its outward movement.

A stationary block 106 projects from the face 104 of the toaster oven. A stop tab 102 is positioned within the internal chamber 84 of the main body 82. When the main body 82 is in the inward longitudinal position, the stop tab 102 is aligned with the stationary block 106 to prevent rotation of the control knob 80 in the second direction from the "off" position to the "stay on" position. When the main body 82 is in the outward longitudinal position (i.e., when it is pulled outward by a user), the stop tab 102 is not aligned with the stationary block 106, thereby permitting rotation of the control knob 80 in the second direction from the "off" position to the "stay on" position. When the user releases the main body 82, the main body 82 and sliding collar 88 return to the inward longitudinal position due to the biasing of the spring 100.

The stationary block and/or the stop tab may be sized and positioned such that, when the control knob is in the "stay on" position, the main body of the control knob is prevented from returning to the inward longitudinal position. This keeps the main body 82 in the outward longitudinal position until the main body is returned to the "off" position. This enables rotation of the timer control knob from the "stay on" position to the "off" position without the user having to pull out the main body.

The stationary block may have an angled surface that engages with the stop tab as the timer control knob begins to rotate from the "stay on" position to the "off" position. Additionally or alternatively, the stop tab may have an angled surface that engages with the stationary block as the timer control knob begins to rotate from the "stay on" position to the "off" position. Such angled surface(s) push the main body longitudinally outward as the timer control knob begins to rotate from the "stay on" position to the "off" position to permit rotation of the timer control knob from the "stay on" position to the "off" position without the user having to pull out the main body.

Figure 7:
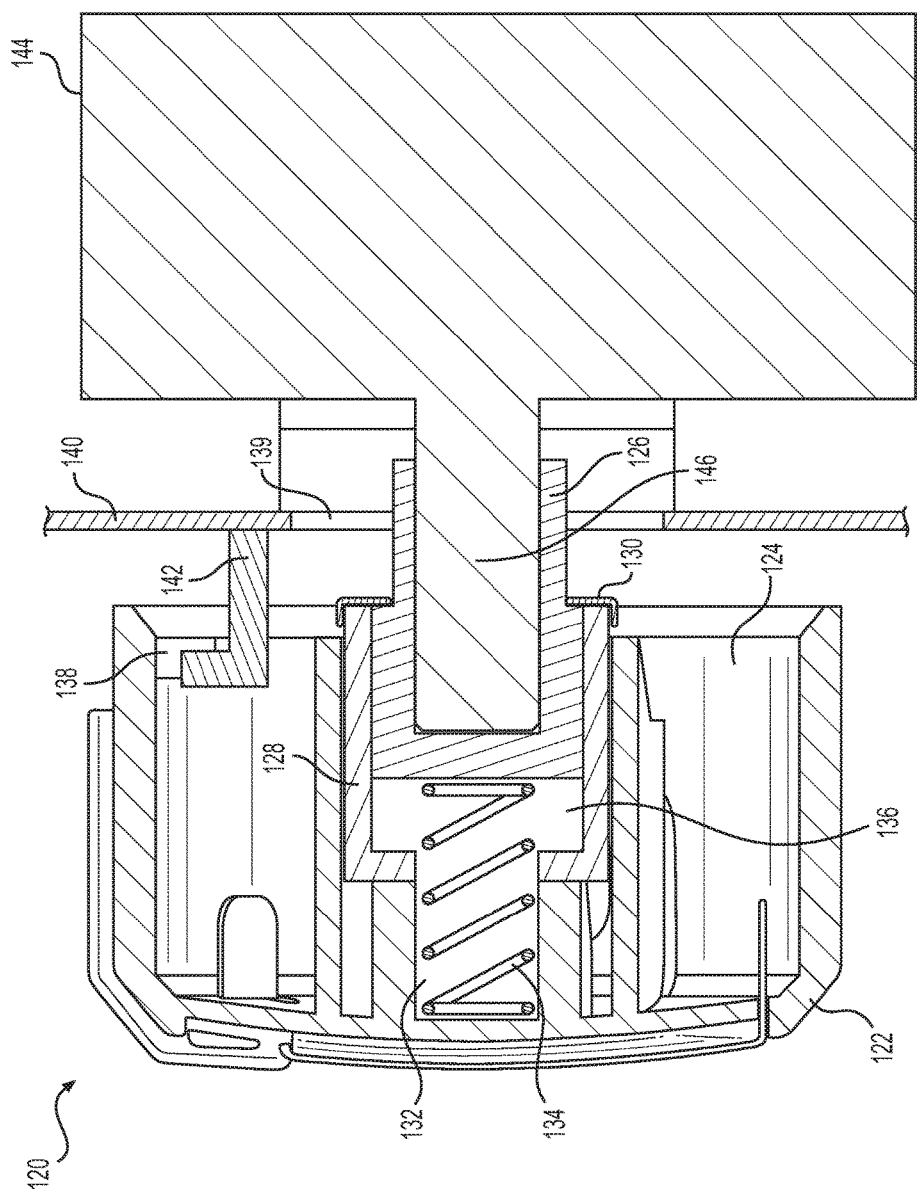
FIG. 7 is a cross-sectional view of a toaster oven control knob, according to an alternative embodiment of the present disclosure.

Referring now to FIG. 7, a toaster oven control knob 120 is illustrated in accordance with an alternative embodiment of the present disclosure. The control knob 120 has a stem 126 that extends from the rear side of the control knob 120, such that the stem 126 protrudes through a hole 139 defined in the face 140 of a toaster oven when the control knob 120 is mounted to the toaster oven. A cavity defined in the stem 126 engages a corresponding post 146 of a mechanical timer 144, so turning the control knob 120 turns the post 146 of the mechanical timer 144. The main body 122 of the control knob 120 may be generally bell-shaped, with an open rear side and hollow interior such that an internal chamber 124 is defined therein. The stem 126 extends out of this chamber 124.

The main body 122 is selectively movable longitudinally between a first (outward) longitudinal position (illustrated in FIG. 7) and a second (inward) longitudinal position (not illustrated). The main body is biased outward toward the first longitudinal position. The main body 122 is further from the face 140 when the main body 122 is in the first longitudinal position than when the main body 122 is in the second longitudinal position. Pushing the main body 122 toward from the face 140 moves the main body from the first longitudinal position to the second longitudinal position. The timer control knob 120 is only selectively rotatable in the second direction from the "off" position to the "stay on" position when the main body is moved from the outward longitudinal position to the inward longitudinal position. In this regard, control knob 120 may be termed a "push-to-turn" knob.

The stem 126 is affixed firmly to the timer shaft 146. A sliding collar 128 is affixed to the main body 122 of the control knob 120. The stem 126 and sliding collar 128 are slidably engaged, such that an enlarged diameter portion of the stem 126 is slidable within an internal chamber 136 of the sliding collar 128. A retaining ring 130 retains the stem 126 slidably engaged with the sliding collar 128 and limits how far the sliding collar (and therefore the main body 122) can move longitudinally outward. The retaining ring 130 is affixed to the sliding collar 128 but not to the stem 126. The stem 126 and sliding collar 128 may comprise corresponding position-assuring mechanisms (e.g., key and slot) such that the stem 126 and sliding collar 128 may only be engaged in one orientation (i.e., the orientation to ensure the proper alignment of the stationary block and stop tab (described below)). It is the slidable engagement between the stem 126 and the sliding collar 128 that enables the main body 122 to be selectively moved longitudinally outward and inward.

A compression spring 134 is positioned (at least partly) within a central cavity 132 of the main body 122. The compression spring 134 extends partially into the chamber 136 of the sliding collar 128 depending on the relative positions of the sliding collar 128 and the stem 126. When a user pushes the main body 122 inward, the main body 122 and sliding collar 128 move longitudinally inward relative to the stem 126. The spring 134 is compressed between the outward wall of the chamber 132 and the stem 126. The main body 122 can only be pushed inward as far as the sliding collar 128 permits—when the shoulder of the sliding collar 128 meets the stem 126, the main body 122 is at the limit of its outward movement.

A stationary block 142 projects from the face 140 of the toaster oven. The outward or distal end of the stationary block is angled. A stop tab 138 is positioned within the internal chamber 124 of the main body 122. When the main body 122 is in the outward longitudinal position, the stop tab 138 is aligned with the stationary block 142 to prevent rotation of the control knob 120 in the second direction from the "off" position to the "stay on" position. When the main body 122 is in the inward longitudinal position (i.e., when it is pushed inward by a user), the stop tab 138 is not aligned with the stationary block 142, thereby permitting rotation of the control knob 120 in the second direction from the "off" position to the "stay on" position. The angled distal end of the stationary block 142 is what enables the stationary block to move out of alignment with the stop tab 138 when the main body 122 is pushed inward by a user. When the user releases the main body 122, the main body 122 and sliding collar 128 return to the outward longitudinal position due to the biasing of the spring 134.

The stationary block and/or the stop tab may be sized and positioned such that, when the control knob is in the "stay on" position, the main body of the control knob is prevented from returning to the outward longitudinal position. This keeps the main body 122 in the inward longitudinal position until the main body is returned to the "off" position. This enables rotation of the timer control knob from the "stay on" position to the "off" position without the user having to push in the main body.

The stationary block may have an angled surface that engages with the stop tab as the timer control knob begins to rotate from the "stay on" position to the "off" position. Additionally or alternatively, the stop tab may have an angled surface that engages with the stationary block as the timer control knob begins to rotate from the "stay on" position to the "off" position. Such angled surface(s) push the main body from the outward longitudinal position to the inward longitudinal position as the timer control knob begins to rotate from the "stay on" position to the "off" position to permit rotation of the timer control knob from the "stay on" position to the "off" position without the user having to push in the main body.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A toaster oven comprising:
   a housing defining a food cavity;
   an opening defined in the housing to enable access to the food cavity;
   a door movably affixed to the housing and selectively movable between a closed position closing off the opening thereby blocking access to the food cavity and an open position enabling access to the food cavity;
   a cooking grid selectively mountable within the housing;
   one or more heating elements within the housing;
   a timer controlling activation of the heating elements; and
   a timer control knob engaged with the timer, the timer control knob being selectively rotatable in a first direction from an off position to a second rotational position to set the timer and activate at least one of the one or more heating elements for a desired amount of time corresponding to the second rotational position, the timer control knob being selectively rotatable in a second direction from the off position to a third rotational position to activate at least one of the one or more heating elements until the timer control knob is selectively rotated in the first direction back to the off position, the second direction being opposite the first direction, the timer control knob comprising:
   a stem affixed to the timer; and
   a main body selectively movably affixed to the stem, the main body selectively movable longitudinally between a first longitudinal position and a second longitudinal position;
   wherein the timer control knob is only selectively rotatable in the second direction from the off position to the third rotational position when the main body is moved from the first longitudinal position to the second longitudinal position.

2. The toaster oven of claim 1, wherein the main body is biased toward the first longitudinal position.

3. The toaster oven of claim 1, wherein a stationary block projects from the housing;
   wherein the control knob further comprises a stop tab;
   wherein, when the main body is in the first longitudinal position, the stop tab is aligned with the stationary block to prevent rotation of the timer control knob in the second direction from the off position to the third rotational position; and
   wherein, when the main body is in the second longitudinal position, the stop tab is not aligned with the stationary block to permit rotation of the timer control knob in the second direction from the off position to the third rotational position.

4. The toaster oven of claim 3, wherein the stationary block and/or the stop tab are sized and positioned such that, when the control knob is in the third rotational position, the main body is prevented from returning to the first longitudinal position.

5. The toaster oven of claim 3, wherein the stationary block has an angled surface that engages with the stop tab as the timer control knob is rotated from the third position in the first rotational direction and/or the stop tab has an angled surface that engages with the stationary block as the timer control knob is rotated from the third position in the first rotational direction, such engagement pushing the main body from the first longitudinal position to the second longitudinal position to permit rotation of the timer control knob in the first rotational direction back to the off position.

6. The toaster oven of claim 1, wherein the main body is further from the housing when the main body is in the first longitudinal position than when the main body is in the second longitudinal position such that pushing the main body toward the housing moves the main body from the first longitudinal position to the second longitudinal position.

7. The toaster oven of claim 1, wherein the main body is further from the housing when the main body is in the second longitudinal position than when the main body is in the first longitudinal position such that pulling the main body away from the housing moves the main body from the first longitudinal position to the second longitudinal position.

\* \* \* \* \*